United States Patent
Ng et al.

(10) Patent No.: US 9,577,518 B2
(45) Date of Patent: Feb. 21, 2017

(54) VOLTAGE CONTROL METHOD AND APPARATUS FOR ACHIEVING AND MAINTAINING A TARGETED VOLTAGE ON A LOAD

(71) Applicant: Alpha and Omega Semiconductor (Cayman), Ltd, Sunnyvale, CA (US)

(72) Inventors: Kong Soon Ng, Taipei (TW); Wei-Chi Huang, Taipei (TW); Jean-Shin Wu, Taipei (TW)

(73) Assignee: Alpha & Omega Semiconductor (Cayman), Ltd., Sunnyvale, CA (US)

( * ) Notice: Subject to any disclaimer, the term of this patent is extended or adjusted under 35 U.S.C. 154(b) by 107 days.

(21) Appl. No.: 14/459,506

(22) Filed: Aug. 14, 2014

(65) Prior Publication Data

US 2015/0244264 A1    Aug. 27, 2015

(30) Foreign Application Priority Data

Feb. 27, 2014    (TW) .............................. 103106713 A

(51) Int. Cl.
  *H02M 3/156*    (2006.01)
  *H02M 3/158*    (2006.01)

(52) U.S. Cl.
  CPC ........... *H02M 3/156* (2013.01); *H02M 3/1588* (2013.01)

(58) Field of Classification Search
  CPC   H02M 3/1588; H02M 3/1563; H02M 3/1566; H02M 2001/0025
  See application file for complete search history.

(56) References Cited

U.S. PATENT DOCUMENTS

| 7,019,506 B2 | 3/2006 | Kernahan |
| 8,716,985 B2 | 5/2014 | Ku et al. |
| 2009/0009148 A1 | 1/2009 | Philbrick |
| 2011/0110127 A1 | 5/2011 | Lee |
| 2015/0177756 A1* | 6/2015 | Yuan .................. G05F 1/56 323/271 |

FOREIGN PATENT DOCUMENTS

WO    2011/148828 A1    12/2011

* cited by examiner

*Primary Examiner* — Harry Behm
(74) *Attorney, Agent, or Firm* — Lance A. Li; Chein-Hwa Tsao; 5Suns

(57) ABSTRACT

The present invention discloses a voltage control method. First, the load voltage of the load is divided to generate a feedback voltage. Then, an absolute value of a periodic triangular wave signal is retrieved to generate a positive feedback signal, which and the feedback voltage are then combined to produce a sum signal. The sum signal is then compared with a target voltage and when the sum signal is less than the target voltage, a control signal is generated and thus the load voltage is updated and stabilized using an input voltage. In an alternative method, the feedback voltage and the periodic triangular wave signal are combined to generate a sum signal, which is compared with the target voltage. When sum signal is less than the target voltage, a control signal is generated and thus the load voltage is for updated and stabilized using an input voltage.

24 Claims, 4 Drawing Sheets

FIG. 1 - Prior Art

VOLTAGE CONTROL METHOD AND APPARATUS FOR ACHIEVING AND MAINTAINING A TARGETED VOLTAGE ON A LOAD

PRIORITY CLAIM

This application claims the priority benefit of Taiwanese patent application number 103106713 filed Feb. 27, 2014 by a common inventor of this application. The entire Disclosure made in the Taiwanese patent application number 103106713 is hereby incorporated by reference.

FIELD OF PRESENT INVENTION

The present invention relates to a control method, and particularly relates to a voltage control method.

BACKGROUND OF RELATED ART

The circuit design for voltage/current control utilizing high-side FET and Low-side FET have many applications involving regulation of electrical power supplies of the integrated circuit. In such application, current flows from the junction between the source of high-side FET and the drain of low-side FET to the load. This load is connected in series with an inductor and in parallel with a capacitor. When the cycle of operation starts, the high-side FET is turned on and the low-side FET is turned off allowing current to flow from high-side FET to inductor, capacitor and load. This current increases as the capacitor charges. When the voltage across the load reaches the target level, the high-side FET is turned off and the low-side FET is turned on, and this current decreases as the capacitor discharges. Hence by switching the high side FET and low side FET alternatively between on and off, the output voltage will not changed due to the increase or decrease of the inductor current.

As shown in FIG. 1, the conventional switching controller consists of a comparator 10, a high-side FET 12 and a low-side FET 14. The drain of the high-side FET 12 is electrically connected to the input voltage $V_{IN}$, and the source of the high-side FET 12 is connected to the drain of the low-side FET 14. The source of the low-side FET 14 is connected to ground. The gate of the high-side FET 12 and that of the low-side FET 14 are respectively connected to the comparator 10. When sufficient voltage is applied to the transistor gate electrode, corresponding current will flow between the drain and the source of the transistor. Through voltage/current control operation, the gate of high-side FET and that of low-side FET are alternately switched on and off. Furthermore, an inductor 16 is connected to the junction connecting the source of high-side FET 12 and the drain of the low-side FET 14. A load 18 is connected in series with the inductor and to ground, and the voltage across the load 18 is the output voltage $V_o$.

When the high-side FET 12 and the low-side FET 14 is about to switch from on to off or vice versa, the gate of the transistors will remain in the original state of on or off for some time. As such, a feedback voltage F is generated from the output voltage $V_O$ using a voltage divider 20. Furthermore, the adder 26 receives a periodic triangular wave signal from the source of the low-side FET and one end of the inductor 16. Adder 26 combines the feedback voltage F and the triangular wave signal together to generate a sum signal S. Comparator 10 compares this sum signal S with a target voltage T generated by a target voltage generator 22. When the sum signal S is equal to the target voltage T, comparator 10 generates a trigger signal to switch the high side FET 12 to off and low side FET 14 to on. In addition, a capacitor 24 is connected in parallel with load 18.

During load transient condition, for example when load 18 changes from overload to light load, the current in load 18 will decrease rapidly, and consequently the current in the inductor 16 will also decrease at the same time. Also when the high side FET 12 is turned off and the low side FET 14 is turned on, the voltage drop across the drain and the source of the low side FET 14 results in a trapezoidal wave signal. If the switching of the high side FET 12 and the low side FET 14 is cyclical, the trapezoidal wave signals are also cyclical. Since the triangular wave signal is formed by subtracting the end voltage of the trapezoidal wave of the previous cycle from the trapezoidal wave of the current cycle, and also because the absolute value of the end voltage of trapezoidal wave of the previous cycle is greater than the absolute value of the trapezoidal wave of the current cycle, the triangular wave will generate a negative voltage, thereby resulting in the sum signal S being less than the target voltage T, thus turning the high side FET on and providing energy to load 18, as such the output voltage increases. At the same time, because the load current 18 decreases rapidly, current will flow from the inductor 16 through the capacitor 24 to ground, causing the output voltage Vo to climb continuously resulting in an unstable phenomenon.

It is within this context that embodiments of the present invention arise.

DESCRIPTION OF THE SPECIFIC EMBODIMENTS

Figure 1:
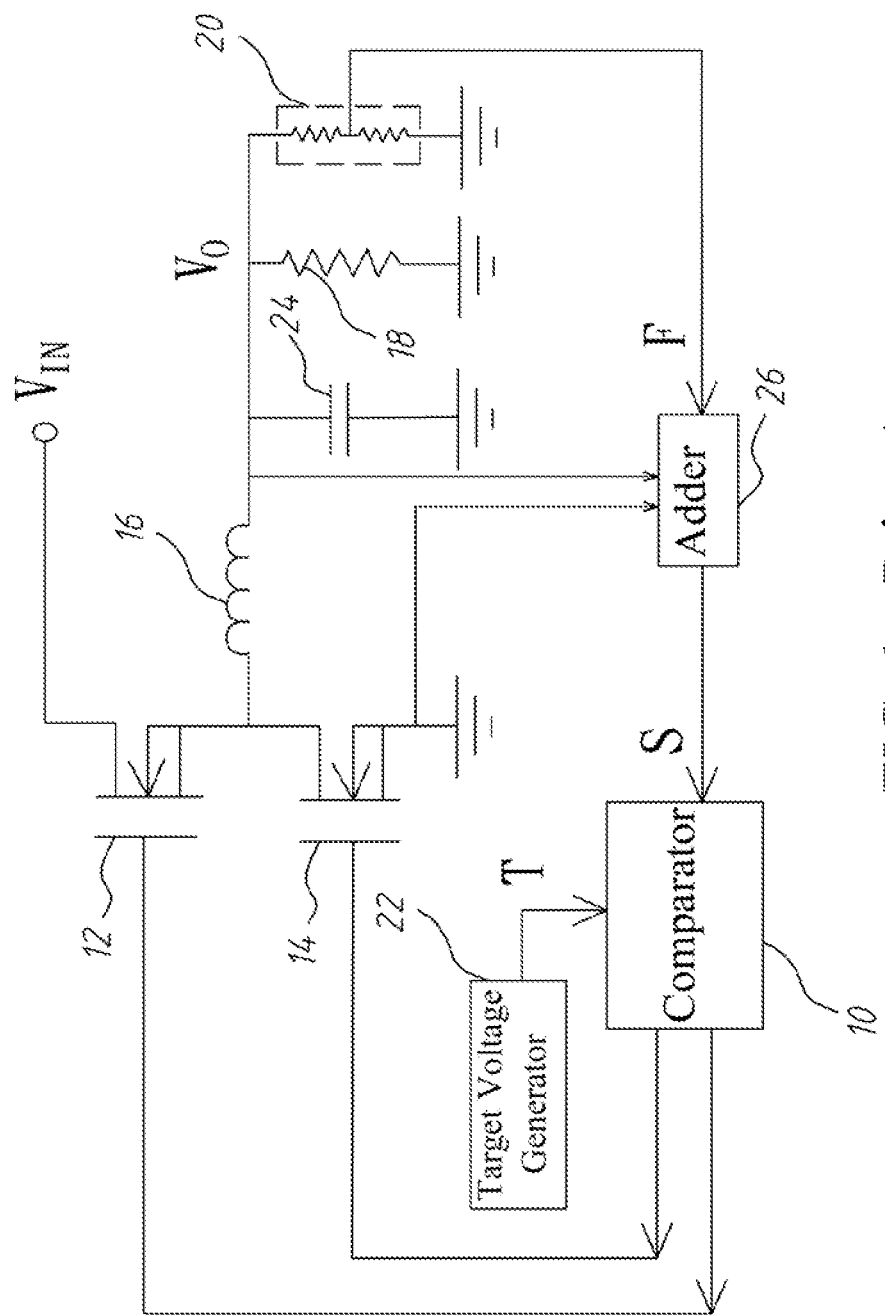
FIG. 1 is a circuit diagram of a switching controller of the prior art.
Figure 2:
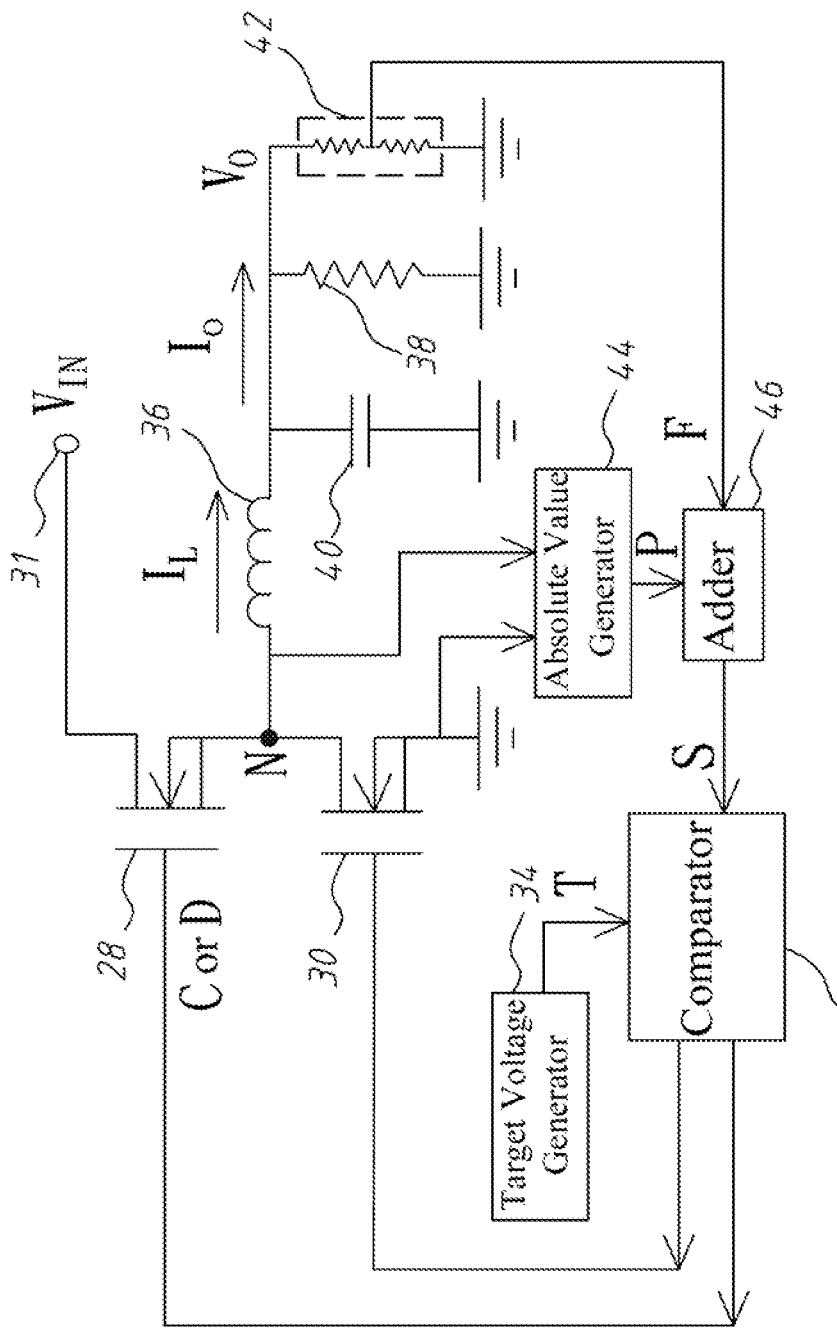
FIG. 2 is a circuit diagram of a switching controller using the voltage control method of the present invention.

FIG. 2 is a circuit diagram of a switching controller of a first embodiment of the present invention. The switching controller includes a first switch 28 and a second switch 30, both of which can be the field-effect transistors (FETs). The first switch 28 is connected to an input voltage source 31, a comparator 32 and the second switch 30. The second switch 30 is connected to ground and comparator 32, which is connected to a target voltage generator 34. The first switch 28 and the second switch 30 are connected to one end of the load 38 through an inductor 36, where the other end of the load 38 is grounded. In addition, load 38 is connected in parallel with a capacitor 40 and a voltage divider 42. The source and drain of the FET 30 is connected to an absolute value generator 44. This absolute value generator 44 and the voltage divider 42 are connected to the adder 46, which is connected to comparator 32.

This switching controller mainly utilizes the comparator 32 to generate a control signal C or an off signal D sent to the first switch 28 and drives the second switch 30 to change their on/off state. When the first switch 28 receives a high level signal as the control signal C, an input voltage $V_{IN}$ from the input source 31 is used to update and stabilize the load voltage $V_O$ on load 38. At this time, the first switch 28 is turned on, the second switch 30 is turned off, therefore, the input voltage source 31 provides an input voltage $V_{IN}$ via the first switch 28 causing the inductor 36 to produce an inductance current $I_L$ flowing to the load 38 and capacitor 40, where the current flowing to load 38 is defined as the output current $I_O$. In addition, when the first switch 28 receives a low level signal as the off signal D, the first switch 28 is turned off and the second electronic switch 30 is turned on. Thus, the current flows from the capacitor 40 through the second switch 30 and the inductor 36 sequentially and gradually decreases.

The voltage control method of the present invention is described as follows. First, the comparator 32 provides a high level signal as the control signal C to the first switch 28 while driving the second switch 30 causing the first switch 28 to turn on and the second electronic switch 30 to turn off. The input voltage source 31 provides an input voltage $V_{IN}$ through the first switch 28, thus the inductor 36 produces an inductance current $I_L$ flowing to the load 38 and capacitor 40 producing a load voltage $V_O$ on the load 38. A voltage divider 42 is then produces a feedback voltage F from load voltage $V_O$. Meanwhile, the comparator 32, as set by user, after the first switch 28 is turned on and the second switch 30 is turned off for a period of time, such as 1 microsecond (μs), provides a low level signal as an off signal D to the first switch 28 while driving the second electronic switch 30, causing the first switch 28 and the second switch 30 to change their on/off state, because at this time the inductor current $I_L$ is decreasing. The absolute value generator 44 receives the voltage drop $V_{DS}$ across the source and drain of FET 30, and accordingly obtains the absolute value of the first triangular wave of a periodic triangular wave signal, producing a positive feedback signal P. Adder 46 receives and combines the positive feedback signal P and the feedback voltage F to produce a sum signal S. Comparator 32 receives and compares the sum signal S and the target voltage T generated by the target voltage generator 34. When the sum signal S is less than the target voltage T, comparator 32 generates a control signal C to the first switch 28 while driving the second switch 30 to switch, causing the first switch 28 to turn on and the second electronic switch 30 to turn off. The first switch receives the control signal C and then provides an input voltage $V_{IN}$ to update and stabilize the load voltage $V_O$. Meanwhile, the comparator 32, as set by user, after the first switch 28 is turned on and the second switch 30 is turned off for a period of time, such as 1 microsecond (μs), provides a low level signal as an off signal D to the first switch 28 while driving the second electronic switch 30, causing the first switch 28 and the second switch 30 to change their on/off state, because at this time the inductor current $I_L$ is decreasing. The absolute value generator 44 receives the voltage drop $V_{DS}$ across the source and drain of FET 30, and accordingly obtains the absolute value of the second triangular wave of a periodic triangular wave signal. Following the same procedure, the voltage control method of the present invention can capture the absolute value of the third triangular wave, and continue to operate on the subsequent cycles.

Figure 3:
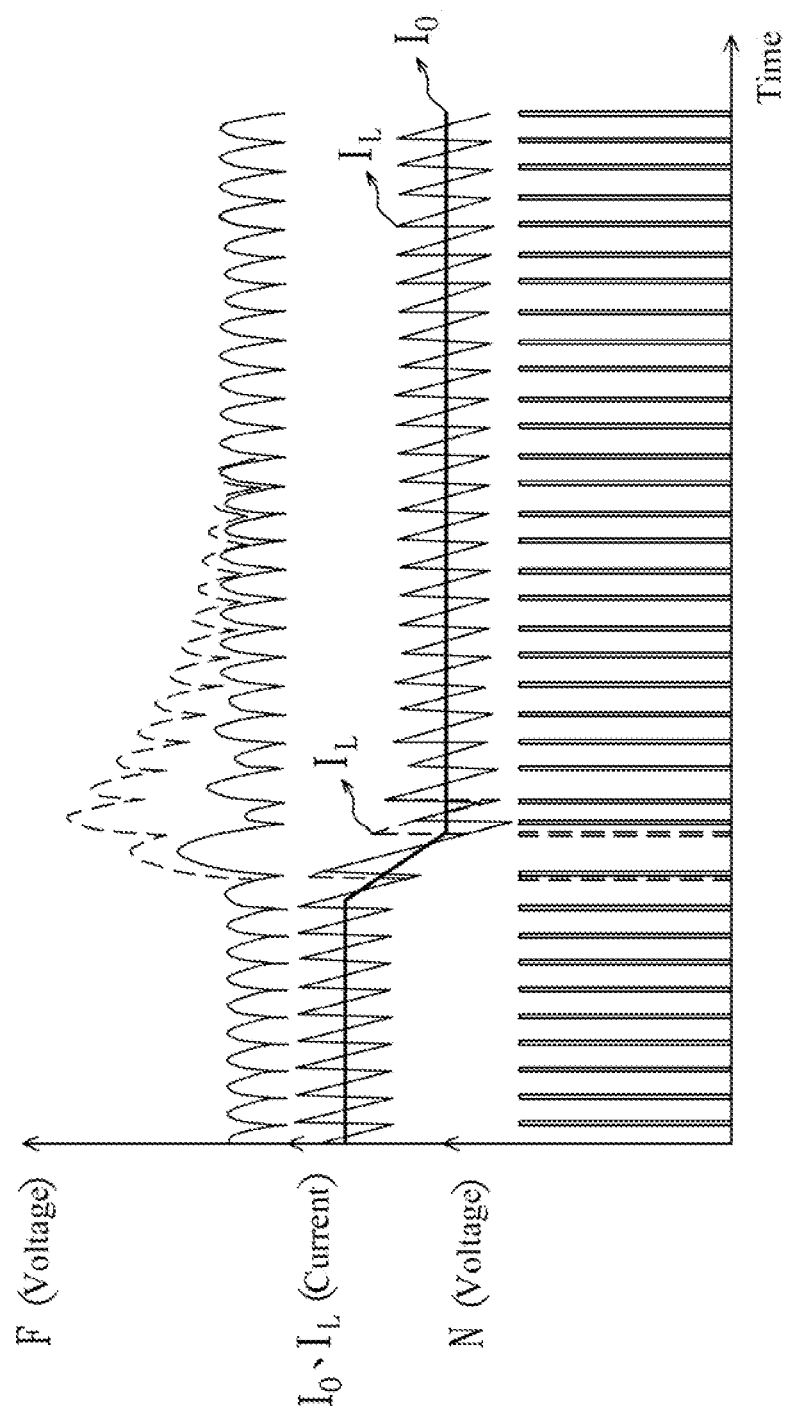
FIG. 3 is a timing diagram showing the different signal waveforms of the present invention

As shown in FIG. 2 and FIG. 3, the point N is the source of the FET 28. In the conventional art, when the load 38 fluctuates, for example, when the load 38 changes from overload to light load, the output current $I_O$ will decrease quickly, and consequently the inductor current $I_L$ will decrease at the same time. As the voltage drop $V_{DS}$ between the source and the drain of the FET 30 drops lower, the triangular wave signal will generate a negative voltage, resulting in the sum signal S being less than the target voltage T, triggering the first switch 28 to turn on, and energy is supplied to the load 38, thus the load voltage $V_O$ increases as shown in dashed line of FIG. 3, where the increase in the feedback voltage F is equivalent to the increase in the load voltage $V_O$. However in the present invention, by using an absolute value generator 44 to filter the negative voltage of the triangular wave signal, the situation of the sum signal S being less than the target voltage T can be easily avoided, thereby preventing the first switch 28 to turn on and supplying energy to the load 38, therefore stabilizing the load voltage $V_O$, as shown by the solid line in FIG. 3. Furthermore, even when the load is in steady state, the use of a triangular wave signal of the present invention having only positive voltage can also stabilize the load voltage $V_O$.

Figure 4:
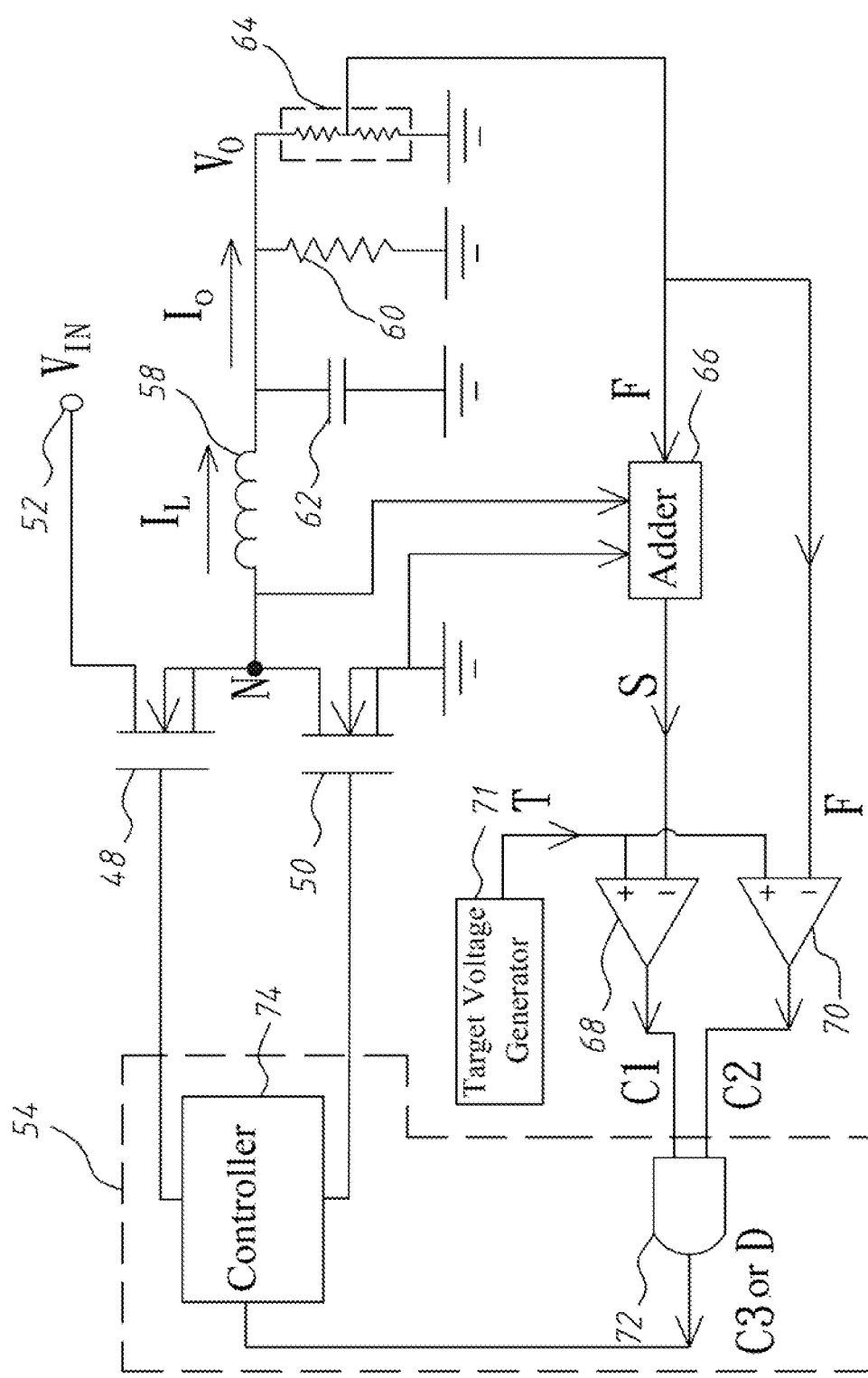
FIG. 4 is a circuit diagram of another switching controller using the voltage control method of the present invention.

FIG. 4 is a circuit diagram of a switching controller according to a second embodiment of the present invention. The switching controller includes a first switch 48 and a second switch 50, both of which may be the FETs. The first switch 48 is connected to an input voltage source 52, a main control unit 54 and the second switch 50. The second switch 50 is grounded and also connected to the main control unit 54. The first switch 48 and the second switch 50 are connected to one end of the load 60 through an inductor 58, where the other end of the load 60 is grounded. In addition, load 60 is also connected in parallel with a capacitor 62 and a voltage divider 64. The source and drain of the FET 50 and the voltage divider 64 are connected to the adder 66. The adder 66 and the voltage divider 64 are connected to a first comparator 68 and a second comparator 70 respectively. Both the first comparator 68 and the second comparator 70 are connected to a target voltage generator 71 and to the main control unit 54. The main control unit 54 consists of an AND gate 72 and a controller 74. Inputs of the AND gate 72 are connected to the first comparator 68 and the second comparator 70, and the output is connected to controller 74. The controller 74 is connected to the gates of the first switch 48 and the second switch 50. The first comparator 68 and the second comparator 70 generate the first control signal C1 and the second control signal C2 respectively, the AND gate 72 takes the product of, i.e., logically ANDs the first control signal C1 and the second control signal C2 to generate a third control signal C3 that is sent to the controller 74, thus the controller 74 triggers the first electronic switch 48 and the second electronic switch 50 to change their on/off state.

This switching controller mainly utilizes the third signal C3 produced by controller 74 or an off signal D to drive the first switch 48 and the second switch 50 to change their on/off state. When the first switch 48 receives a high level signal as the third control signals C3, the first switch 48 is turned on, and the second switch 50 is turned off, thus the input voltage source 52 provides an input voltage $V_{IN}$ through the first switch 48, causing the inductor 58 to produce an inductance current $I_L$ flowing to load 60 and capacitor 62, where the current flowing to the load 60 is defined as output current $I_O$. Further, when the first switch 48 receives a low level signal as an off signal D, the first switch 48 is turned off, the second switch 50 is turned on, thus current flows from the capacitor 62 to the second switch 50 and the inductor 58 in sequence and gradually decreases.

The voltage control method of the present invention in this embodiment is described as follows. First, the controller 74 provides a high level signal as the third control signals C3 to the first switch 48 and drives the second switch 50, causing the first switch 48 to turn on and the second switch 50 to turn off. The input voltage source 52 then provides an input voltage $V_{IN}$ through the first switch 48 causing the inductor 58 to generate an inductance current $I_L$ flowing to the load 60 and capacitor 62, resulting in a load voltage $V_O$ on load 60. The voltage divider 64 divides the load voltage $V_O$ to generate a feedback voltage F. Meanwhile, the controller 74, as set by the user, after the first switch 48 is turned on and the second switch 50 is turned off for a period of time, e.g., 1 microsecond (μs), provides a low level signal as the off signal D to the first switch 48 and drives the second electronic switch 50, causing the first electronic switch 48 and the second electronic switch 50 to change their on/off state. At this point, the inductor current $I_L$ is decreasing. At the same time, the adder 66 receives the voltage drop $V_{DS}$ across the source and drain of the FET 50, and accordingly captures the first triangular wave of a periodic triangle wave signals, combines it with the feedback voltage F to generate a sum signal S. The first comparator 68 receives the sum signal S and compares it with the target voltage T generated by the target voltage generator 71, and when this sum signal S is less than the target voltage T, a high level signal as the first control signal C1 is generated. The second comparator 70 receives and compares the feedback voltage F with the target voltage T, and when the feedback voltage F is less than the target voltage T, a high-level signal as the second control signal C2 is generated. The AND gate 72 receives and takes the product of, i.e., logically ANDs the first control signal C1 and the second control signal C2 to produce a high level signals as a third control signal C3. The controller 74 receives this third control signal C3, and accordingly drives the first switch 48 to turn on and the second switch 50 to turn off, and then using the input voltage $V_{IN}$ to update and stabilize the load voltage $V_O$.

In the above method, the AND gate 72 is used to receive and take the product of, i.e., logically AND the first control signal C1 and the second control signal C2 to generate the third control signal C3. Then, the controller 74 receives the third control signal C3 and accordingly drives the first switch 48 and the second switch 50, and then uses the input voltage $V_{IN}$ to update and stabilize the load voltage $V_O$. Alternatively, the main control unit 54 can receive the first control signal C1 and the second control signal C2 and accordingly drives the first switch 48 and the second switch 50 and using the input voltage $V_{IN}$ to update and stabilize the load voltage $V_O$.

With reference to FIG. 3 and FIG. 4, the point N is the source of the FET 48. In the conventional art, when the load 60 fluctuates, for example, when the load 60 changes from overload to the light load, the output current $I_O$ will decrease rapidly. As the voltage drop $V_{DS}$ between the source and the drain of the FET 50 decreases, the triangular wave signal generates a negative voltage resulting in the sum signal S being less than the target voltage T, driving the first switch 48 to turn on, thus the energy is supplied to the load 60 and the load voltage $V_O$ increases as shown in dashed line, where the increase in the feedback voltage F is equivalent to the increase in the load voltage $V_O$. In other words, because of the triangular wave signal includes a negative voltage, comparing with the triangular wave signal not including a negative voltage, load voltage $V_O$ can be higher. However, before the load voltage $V_O$ drops, because the negative voltage of the triangular wave signal is too small, the load voltage $V_O$ again increases higher in the next cycle. In the present invention, the second comparator 70 is used to receive and compare the feedback voltage F and the target voltage T and being coupled with the AND gate 72, so that when the feedback voltage F is higher than the target voltage T, the first switch 48 is turned off preventing energy supplied to the load 60 to stabilize the load voltage $V_O$ as shown by the solid line in FIG. 3. Furthermore, even during a steady load condition, by blocking the supply of energy when the feedback voltage F is greater than the target voltage T, the method of the present invention can still stabilize the load voltage $V_O$.

In summary, the present invention makes use of the difference between the feedback voltage and the target voltage, or a triangular wave signal with only positive voltage, as the basis to change the on/off state of the switches to achieve the goal of stabilizing the load voltage.

The above detailed descriptions are provided to illustrate specific embodiments of the present invention and are not intended to be limiting. Numerous modifications and variations within the scope of the present invention are possible. The present invention is defined by the appended claims.

The invention claimed is:

1. A voltage control method comprising the steps of:
dividing a load voltage of a load to generate a feedback voltage and capturing an absolute value of a periodic triangular wave signal to produce a positive feedback signal;
adding the feedback voltage and the positive feedback signal to produce a sum signal;
comparing the sum signal with a target voltage, wherein when the sum signal is less than the target voltage, generating a control signal; and
receiving the control signal and accordingly updating and stabilizing the load voltage using an input voltage.

2. The voltage control method of claim 1, wherein the control signal is a high-level signal.

3. The voltage control method of claim 1, wherein the load is connected to a voltage divider dividing the load voltage to generate the feedback voltage.

4. The voltage control method of claim 3, wherein the load is connected to a first switch and a second switch; the second switch is connected to ground; the first switch receives the control signal and uses the input voltage to update and stabilize the load voltage based on the control signal.

5. The voltage control method of claim 4, wherein the load is connected in parallel with a capacitor.

6. The voltage control method of claim 5, wherein the second switch is connected to an absolute value generator connected to an adder together with the voltage divider, wherein the absolute value generator receives a voltage drop across the second switch and accordingly captures the absolute value of the triangular wave signal to generate a positive feedback signal to the adder, and wherein the feedback voltage divider sends the feedback voltage to the adder for combining the positive feedback signal and the feedback voltage to produce the sum signal.

7. The voltage control method of claim 6, wherein the adder and a target voltage generator are connected to a comparator connected to the first switch and the second switch, wherein the comparator receives and compares the target voltage generated by the target voltage generator and the sum signal then generates the control signal to the first switch and drives the second switch.

8. The voltage control method of claim 7, wherein when the first switch is turned on, the second switch is turned off, and when the first switch is turned off, the second switch is turned on.

9. A voltage control method comprising the steps of:
dividing a load voltage of a load to generate a feedback voltage;
adding the feedback voltage and a periodic triangular wave signal periodic triangular wave signal being extracted from a voltage drop across the source and drain of a low side FET to generate a sum signal;

comparing the sum signal and the feedback voltage respectively with a target voltage, wherein when the sum signal and the feedback voltage are both less than the target voltage, generating a first control signal and a second control signal respectively;

taking the product of, i.e., logically ANDing the first control signal and the second control signal to generate a third control signal; and following the third control signal and accordingly updating and stabilizing the load voltage using an input voltage.

10. The voltage control method of claim 9, wherein the first control signal and the second control signals are high-level signals.

11. The voltage control method of claim 9, wherein the third control signal is a high-level signal.

12. The voltage control method of claim 11, wherein the load is connected a voltage divider, which divides the load voltage to generate the feedback voltage.

13. The voltage control method of claim 12, wherein the load is connected to a first switch and a second switch; the second switch is connected to ground; the first switch and the second switch is connected to a controller, which is connected the output terminal of an AND gate; the input terminals of the AND gate are connected to a first comparator and a second comparator; the first comparator receives and compares the target voltage and the sum signal then generates the first control signal; the second comparator receives and compares the target voltage and the feedback voltage then generates the second control signal; the AND gate receives and takes the product of, i.e., logically ANDs the first control signal and the second control signal to generate the third control signal; the controller receives the third control signal and accordingly drives the first switch and the second switch to update and stabilize the load voltage using the input voltage.

14. The voltage control method of claim 13, wherein the load is connected in parallel with a capacitor.

15. The voltage control method of claim 14, wherein the second switch and the voltage divider are connected to an adder, which receives the feedback voltage and the triangular wave signal formed by the voltage drop across the second switch to generate the sum signal.

16. The voltage control method of claim 15, wherein the adder and a voltage generator are connected to the first comparator, and the voltage divider and the target voltage generator are connected to the second comparator.

17. The voltage control method of claim 16, wherein when the first switch is turned on, the second switch is turned off, and when the first switch is turned off, the second switch is turned on.

18. A voltage control apparatus comprises:
a voltage divider connected to a load for dividing a load voltage of the load to generate a feedback voltage;
an absolute value generator for generating an absolute value of a periodic triangular wave signal to produce a positive feedback signal;
an adder for adding the feedback voltage and the positive feedback signal to produce a sum signal;
a target voltage generator for generating a target voltage of the load;
a comparator for comparing the sum signal with the target voltage and generating a control signal when the sum signal is less than the target voltage; and
a first switch and a second switch for receiving the control signal and an input voltage respectively to update and stabilize the load voltage.

19. The voltage control apparatus of claim 18, wherein the control signal is a high-level signal.

20. The voltage control apparatus of claim 18, wherein the load is connected to the first switch and the second switch; the second switch is connected to ground; the first switch receives the control signal and uses the input voltage to update and stabilize the load voltage based on the control signal.

21. The voltage control apparatus of claim 20, wherein the load is connected in parallel with a capacitor.

22. The voltage control apparatus of claim 21, wherein the second switch is connected to the absolute value generator connected to the adder together with the voltage divider, wherein the absolute value generator receives a voltage drop across the second switch and accordingly captures the absolute value of the triangular wave signal to generate the positive feedback signal to the adder, and wherein the feedback voltage divider sends the feedback voltage to the adder for combining the positive feedback signal and the feedback voltage to produce the sum signal.

23. The voltage control apparatus of claim 22, wherein the adder and the target voltage generator are connected to the comparator connected to the first switch and the second switch, wherein the comparator receives and compares the target voltage generated by the target voltage generator and the sum signal then generates the control signal to the first switch and drives the second switch.

24. The voltage control apparatus of claim 23, wherein when the first switch is turned on, the second switch is turned off, and when the first switch is turned off, the second switch is turned on.

* * * * *